(12) United States Patent
Pudleiner et al.

(10) Patent No.: US 8,652,623 B2
(45) Date of Patent: Feb. 18, 2014

(54) COEXTRUDED FILMS WITH LOW TEMPERATURE IMPACT RESISTANCE

(75) Inventors: Heinz Pudleiner, Krefeld (DE); Robert Maleika, Düsseldorf (DE); Birgit Meyer Zu Berstenhorst, Leverkusen (DE); Frank Buckel, Kempen (DE); Klaus Meyer, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 7 days.

(21) Appl. No.: 13/319,603

(22) PCT Filed: May 4, 2010

(86) PCT No.: PCT/EP2010/002698
§ 371 (c)(1),
(2), (4) Date: Jan. 25, 2012

(87) PCT Pub. No.: WO2010/130347
PCT Pub. Date: Nov. 18, 2010

(65) Prior Publication Data
US 2012/0135213 A1     May 31, 2012

(30) Foreign Application Priority Data
May 12, 2009 (DE) .......................... 10 2009 020 937

(51) Int. Cl.
*B32B 7/02* (2006.01)

(52) U.S. Cl.
USPC ........... 428/212; 428/215; 428/216; 428/220; 525/148

(58) Field of Classification Search
USPC ................... 428/212, 215, 216, 220; 525/148
See application file for complete search history.

(56) References Cited

U.S. PATENT DOCUMENTS

| 2004/0039083 A1 | 2/2004 | Schultes et al. |
| 2011/0230610 A1 | 9/2011 | Schultes et al. |

FOREIGN PATENT DOCUMENTS

| DE | 103 49 144 A1 | 5/2005 |
| JP | 2006-103169 A | 4/2006 |
| WO | WO-0236683 A1 | 5/2002 |
| WO | WO-2006005090 A1 | 1/2006 |
| WO | WO-2007008304 A1 | 1/2007 |
| WO | WO-2007050230 A1 | 5/2007 |
| WO | WO-2008074525 A1 | 6/2008 |

OTHER PUBLICATIONS

Schnell, Chemistry and Physics of Polycarbonates, Polymer Reviews, vol. 9, Interscience Publishers, New York, London, Sydney 1964.
Prevorsek, D.C., *Synthesis of Poly(ester Carbonate) Copolymers* (1980), vol. 18, Journal of Polymer Science, Polymer Chemistry Edition, pp. 75-90.
Freitag, D., et al., *Polycarbonates* (1988), vol. 11, 2nd edition, Encyclopedia of Polymer Science and Engineering, pp. 648-718.

*Primary Examiner* — Mark Ruthkosky
*Assistant Examiner* — Lawrence Ferguson
(74) *Attorney, Agent, or Firm* — Novak Druce Connolly Bove + Quigg LLP

(57) ABSTRACT

The invention relates to multilayer products comprising a layer (A) and a layer (B), wherein layer (A) contains polyalkyl(alkyl)acrylate and has a layer thickness <25 [mu]m, and layer (B) contains polycarbonate. The total thickness of layers (A) and (B) is 20 to 500 mm.

12 Claims, No Drawings

COEXTRUDED FILMS WITH LOW TEMPERATURE IMPACT RESISTANCE

CROSS-REFERENCE TO RELATED APPLICATIONS

This application is a national stage application (under 35 U.S.C. §371) of PCT/EP2010/002698, filed May 4, 2010, which claims benefit of German application 10 2009 020 937.9, filed May 12, 2009, both of which are incorporated herein by reference in their entirety for all their useful purposes.

BACKGROUND

The present invention relates to multilayered films with low temperature impact resistance comprising a first and a second layer, wherein the second layer contains polycarbonate, and wherein the first layer is an impact-modified polyalkyl acrylate which has a layer thickness of less than 25 µm. The invention moreover relates to the production of these multilayered films, such as e.g. mobile phone lenses, which contain the multilayered shaped articles mentioned.

The prior art on multilayered films is summarized in the following by way of example.

PC/PMMA films which pass a falling ball test without fracture at room temperature with a ball weighing 13.5 g are already described in WO 2008/074525. This application gives no indication of the behaviour of such composite films at −30° C. WO 2008/074525 describes multilayered articles of plastic with a base layer of polycarbonate and a poly(meth) acrylate layer attached on this, wherein the total thickness of the multilayered article of plastic is between 0.05 mm to 0.49 mm and between 1.21 mm to 5 mm and the total thickness of the poly(meth)acrylate layer is between 5% and 50% of the total thickness of the multilayered article of plastic, and the two layers are bonded by coextrusion. The films described here have a layer thickness which lies outside.

JP 2006-103169 A describes a multilayered product with an acrylic resin layer of from 50 to 120 µm and a polycarbonate layer of from 0.5 mm to 1.2 mm (500 µm to 1,200 µm), which therefore lies outside the range claimed here.

It has been found, however, that the known acrylate/polycarbonate films have a still inadequate low temperature impact resistance for some uses, in particular for external uses with permanently high requirements with respect to the impact resistance, such as, for example, glazing.

DESCRIPTION OF PREFERRED EMBODIMENTS

The object of this application is to provide a multilayered film which comprises a first layer which is an impact-modified polyacrylate, and a second layer which contains polycarbonate, this multilayered film still being impact-resistant at −30° C.

Impact-resistant in the context of the application is understood as meaning that the polyacrylate layer of the multilayered film is struck in a falling ball test. For the use of these films in e.g. an automobile as glazing, this corresponds to the case where an object, for example, flies against the windscreen during driving in a very severe frost. The windscreen should not thereby suffer brittle fracture.

It has been found that the polyacrylate layer should not exceed a particular layer thickness, and that impact-modified polyacrylates are particularly suitable for this.

The present invention therefore provides a multilayered product comprising a first layer (A) and a second layer (B), wherein the first layer (A) is made of polyalkyl(alkyl)acrylate and has a layer thickness of <25 µm, preferably <20 µm, particularly preferably <18 µm, and the second layer (B) contains a polycarbonate. In this context, the layers (A) and (B) can assume the form of a film or a coextruded layer.

Layer (A) in general has at least a thickness of >0 µm, preferably >1 µm and in particular >2 µm. The thickness of the layer (A) is particularly preferably 10 µm to 21 µm, in particular 13 µm to 21 µm.

The layers (A) and (B) according to the invention in general have a total layer thickness of from 20 µm to 500 µm. Preferred total layer thicknesses are on the one hand 25 µm to 100 µm, particularly preferably 25 µm to 40 µm. Further preferred total layer thicknesses are 80 µm to 450 µm, particularly preferably 100 µm to 400 µm, very particularly preferably 120 µm to 380 µm and in particular 180 µm to 320 µm. Very particularly preferred total layer thicknesses for automobile uses, in particular automobile glazing, are total layer thicknesses of from 360 µm to 410 µm.

The multilayered product according to the invention can comprise further layers, in particular a UV protection layer (C), which contains polyalkyl(alkyl)acrylate and a UV stabilizer and can assume the form of a film, a coextruded layer or a cured lacquer layer.

The layers (A) and (C) according to the invention contain a polyalkyl(alkyl)acrylate as the polymer matrix. Polyalkyl(alkyl)acrylates in the context of the present invention are homo-, co- or terpolymers and preferably contain C1 to C10-alkyl esters of acrylic acid or of methacrylic acid as the monomer unit, or mixtures thereof. C1 to C4 alkyl esters of methacrylic acid are preferred. Methyl methacrylate is particularly preferred, and is preferably employed in amounts of from 50 to 100 wt. % of the monomer mixtures. The comonomer is preferably chosen from the group consisting of acrylate and methacrylate which are different to the first monomer, and ethylenically unsaturated monomers, such as, for example, styrene, alpha-methylstyrene and acrylonitrile. Branching agents can likewise be added to the monomer mixture. Particularly preferred substances are polymethyl (meth)acrylates with a methyl methacrylate monomer content of at least 80 wt. %, preferably at least 90 wt. %, and optionally 0 wt. % to 20 wt. %, preferably 0 wt. % to 10 wt. % of further vinylically copolymerizable monomers, such as e.g. C1- to C8-alkyl esters of acrylic acid or C2- to C8-alkyl esters of methacrylic acid, for example and preferably methyl acrylate, ethyl acrylate, butyl acrylate, butyl methacrylate, hexyl methacrylate and cyclohexyl methacrylate, and furthermore styrene and styrene derivatives, such as, for example, alpha-methylstyrene or p-methylstyrene. Acrylic acid, methacrylic acid, maleic anhydride and hydroxy-C1- to C8-alkyl esters of acrylic acid or of methacrylic are suitable as further comonomers.

Impact-modified acrylate moulding compositions are known in principle from the applications WO 2007/050230 and WO 2007/008304 (EP 1910464).

Impact-modified polyalkyl(alkyl)acrylates are particularly preferred. Impact modifiers such that the refractive index (RI) of the matrices and of the impact modifier coincide or are identical or almost identical are preferably employed. The impact modifier can be employed in a concentration of from 5 to 60% by weight, preferably from 8 to 40% by weight and particularly preferably of 10-20% by weight, based on the total weight of the layer. The impact modifier has a core-shell particle structure of at least three shells and has a hard core (glass transition temperature Tg>0° C., preferably Tg>25° C., preferably Tg>40° C.). The hard core can be a solid polymer with a Tg>0° C. However, the hard core can also be a combination of a small amount of a rubber core seed of low Tg, on which the hard core is formed. Thus, for example, a small 5 wt. % of rubber core seed scattered into a hard core would be included in the invention as a hard core as long as the combination behaves as a hard core. In one embodiment, the core is a crosslinked poly(methyl methacrylate/ethyl acrylate) copolymer, the middle layer is a crosslinked poly(butyl acrylate/styrene) copolymer and the outer shell is a poly(methyl methacrylate/ethyl acrylate) copolymer.

The impact modifier in general has an average particle size of less than 225 nanometres, and preferably of from 50 to 200 nanometres, determined by means of atomic force microscopy (AFM).

In a preferred embodiment, the core is a crosslinked poly (methyl methacrylate/ethyl acrylate) copolymer, the middle layer is a crosslinked poly(butyl acrylate/styrene) copolymer and the outer layer is a poly(methyl methacrylate/ethyl acrylate) copolymer. Impact-modified polymethyl methacrylates are obtainable under the brand name Altuglas® from Arkema.

The impact-modified layer can contain other additives, such as stabilizers, plasticizers, fillers, colouring agents, pigments, antioxidants, antistatic agents, surfactants and toners.

Suitable polycarbonates for the second layer (B) of the multilayered products according to the invention are all the known polycarbonates, and these can be homopolycarbonates, copolycarbonates and thermoplastic polyester carbonates.

They preferably have average molecular weights $\overline{M}_w$ of from 18,000 to 40,000, preferably from 22,000 to 36,000 and in particular from 24,000 to 33,000, determined by measurement of the relative solution viscosity at 25° C. in methylene chloride or in mixtures of equal amounts by weight of phenol/o-dichlorobenzene, calibrated by light scattering.

For the preparation of polycarbonates, reference may be made by way of example to "Schnell, Chemistry and Physics of Polycarbonates, Polymer Reviews, vol. 9, Interscience Publishers, New York, London, Sydney 1964", and to "D. C. PREVORSEK, B. T. DEBONA and Y. KESTEN, Corporate Research Center, Allied Chemical Corporation, Moristown, N.J. 07960, 'Synthesis of Poly(ester)carbonate Copolymers' in Journal of Polymer Science, Polymer Chemistry Edition, vol. 19, 75-90 (1980)", and to "D. Freitag, U. Grigo, P. R. Müller, N. Nouvertne, BAYER AG, 'Polycarbonates' in Encyclopedia of Polymer Science and Engineering, vol. 11, second edition, 1988, pages 648-718" and finally to "Dres. U. Grigo, K. Kircher and P. R. Müller 'Polycarbonate' in Becker/Braun, Kunststoff-Handbuch, volume 3/1, Polycarbonate, Polyacetale, Polyester, Celluloseester, Carl Hanser Verlag Munich, Vienna 1992, pages 117-299".

Compounds which are preferably to be employed as starting compounds are bisphenols of the general formula HO—Z—OH, wherein Z is a divalent organic radical having 6 to 30 carbon atoms, which contains one or more aromatic groups.

Dihydroxyaryl compounds which are suitable for the preparation of polycarbonates are those of the formula (I)

HO—Z—OH        (1)

in which

Z is an aromatic radical having 6 to 30 C atoms, which can contain one or more aromatic nuclei, can be substituted and can contain aliphatic or cycloaliphatic radicals or alkylaryls or hetero atoms as bridge members.

Preferably, in formula (1) Z represents a radical of the formula (1a)

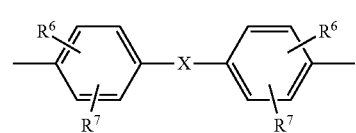

(1a)

in which $R^6$ and $R^7$ independently of one another represent H, $C_1$-$C_{18}$-alkyl, $C_1$-$C_{18}$-alkoxy, halogen, such as Cl or Br, or in each case optionally substituted aryl or aralkyl, preferably H or $C_1$-$C_{12}$-alkyl, particularly preferably H or $C_1$-$C_8$-alkyl and very particularly preferably H or methyl, and X represents a single bond, —SO$_2$—, —CO—, —O—, —S—, $C_1$- to $C_6$-alkylene, $C_2$- to $C_5$-alkylidene or $C_5$- to $C_6$-cycloalkylidene, which can be substituted by $C_1$- to $C_6$-alkyl, preferably methyl or ethyl, or furthermore represents $C_6$- to $C_{12}$-arylene, which can optionally be condensed with further aromatic rings containing hetero atoms.

Preferably, X represents a single bond, $C_1$ to $C_5$-alkylene, $C_2$ to $C_5$-alkylidene, $C_5$ to $C_6$-cycloalkylidene, —O—, —SO—, —CO—. —S—, —SO$_2$—, or a radical of the formula (Ib) or (Ic)

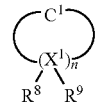

(1b)

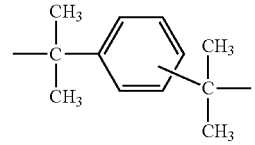

(1c)

wherein $R^8$ and $R^9$ can be chosen individually for each $X^1$ and independently of one another denote hydrogen or $C_1$ to $C_6$-alkyl, preferably hydrogen, methyl or ethyl and $X^1$ denotes carbon and n denotes an integer from 4 to 7, preferably 4 or 5, with the proviso that on at least one atom $X^1 R^8$ and $R^9$ are simultaneously alkyl.

Examples of such compounds are bisphenols which belong to the group of dihydroxydiphenyls, bis(hydroxyphenyl)alkanes, indanebisphenols, bis(hydroxyphenyl)ethers, bis(hydroxyphenyl) sulfones, bis(hydroxyphenyl) ketones and α,α'-bis(hydroxypheny)diisopropylbenzenes.

Particularly preferred bisphenols which belong to the abovementioned groups of compounds are bisphenol A, tetraalkylbisphenol A, 4,4-(meta-phenylenediisopropyl)diphenol (bisphenol M), 4,4-(para-phenylenediisopropyl)diphenol, N-phenyl-isatinbisphenol, 1,1-bis-(4-hydroxyphenyl)-3,3,5-trimethylcyclohexane (BP-TMC), bisphenols of the 2-hydrocarbyl-3,3-bis(4-hydroxyaryl)phthalimidine type, in particular 2-phenyl-3,3-bis(4-hydroxyphenyl)phthalimidine, and optionally mixtures thereof. Homopolycarbonates based on bisphenol A and copolycarbonates based on the monomers bisphenol A and 1,1-bis-(4-hydroxyphenyl)-3,3,5-trimethylcyclohexane are particularly preferred. The bisphenol compounds to be employed according to the invention are reacted with carbonic acid compounds, in particular phosgene, or, in the melt transesterification process, with diphenyl carbonate or dimethyl carbonate.

Very particularly preferred bisphenols which belong to the abovementioned groups of compounds are bisphenol A, tetraalkylbisphenol A, 4,4-(meta-phenylenediisopropyl)diphenol (bisphenol M), 4,4-(para-phenylenediisopropyl)diphenol, 1,1-bis-(4-hydroxyphenyl)-3,3,5-trimethylcyclohexane (BP-TMC) and optionally mixtures thereof.

Polyester carbonates are preferably obtained by reaction of the bisphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids. Some, up to 80 mol %, preferably from 20 to 50 mol %, of the carbonate groups in the polycarbonates can be replaced by aromatic dicarboxylic acid ester groups.

The preparation of the polycarbonates is preferably carried out by the interfacial process or the melt transesterification process and is described in the following by the interfacial process by way of example.

Inert organic solvents used in the interfacial process are, for example, methylene chloride, the various dichloroethanes and chloropropane compounds, carbon tetrachloride, chloroform, chlorobenzene and chlorotoluene, and chlorobenzene or methylene chloride or mixtures of methylene chloride and chlorobenzene are preferably employed.

The interfacial reaction can be accelerated by catalysts, such as tertiary amines, in particular N-alkylpiperidines, or onium salts. Tributylamine, triethylamine and N-ethylpiperidine are preferably used. In the case of the melt transesterification process, the catalysts mentioned in DE-A 4 238 123 are preferably used.

The polycarbonates can preferably be branched deliberately and in a controlled manner by the use of small amounts of branching agent. Some suitable branching agents are: phloroglucinol, 4,6-dimethyl-2,4,6-tri-(4-hydroxyphenye-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; α,α',α"-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and, in particular: 1,1,1-tri-(4-hydroxyphenyl)-ethane and bis-(3-methyl-4-hydroxyphenyl)-2-oxo-2,3-dihydroindole.

The 0.05 to 2 mol %, based on the diphenols employed, of branching agents or mixtures of branching agents optionally to be co-used can be employed together with the diphenols, but can also be added in a later stage of the synthesis.

Phenols, such as phenol, alkylphenols, such as cresol and 4-tert-butylphenol, chlorophenol, bromophenol, cumylphenol or mixtures thereof, are preferably used as chain terminators in amounts of 1-20 mol %, preferably 2-10 mol % per mol of bisphenol. Phenol, 4-tert-butylphenol and cumylphenol are preferred.

Chain terminators and branching agents can be added to the syntheses separately, but also together with the bisphenol.

The preparation of polycarbonates by the melt transesterification process is described by way of example in DE-A 4238 123.

Polycarbonates which are preferred according to the invention for the second layer of the multilayered product according to the invention are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The homopolycarbonate based on bisphenol A is particularly preferred.

The polycarbonate can contain stabilizers. Suitable stabilizers are, for example, phosphines, phosphites or Si-containing stabilizers and further compounds described in EP 0 500 496. Examples which may be mentioned are triphenyl phosphites, diphenyl alkyl phosphites, phenyl dialkyl phosphites, tris-(nonylphenyl)phosphite, tetrakis-(2,4-di-tert-butylphenyl)-4,4'-biphenylene-diphosphonite and triaryl phosphites. Triphenylphosphine and tris-(2,4-di-tert-butylphenyl)phosphite are particularly preferred.

The polycarbonate-containing second layer (B) of the multilayered product according to the invention can furthermore contain 0.01 to 0.5 wt. % of the esters or partial esters of mono- to hexahydric alcohols, in particular of glycerol, of pentaerythritol or of Guerbet alcohols.

Monohydric alcohols are, for example, stearyl alcohol, palmityl alcohol and Guerbet alcohols.

A dihydric alcohol is, for example, glycol.

A trihydric alcohol is, for example, glycerol.

Tetrahydric alcohols are, for example, pentaerythritol and mesoerythritol.

Pentahydric alcohols are, for example, arabitol, ribitol and xylitol.

Hexahydric alcohols are, for example, mannitol, glucitol (sorbitol) and dulcitol.

The esters are preferably the monoesters, diesters, triesters, tetraesters, pentaesters and hexaesters or mixtures thereof, in particular statistical mixtures, of saturated, aliphatic $C_{10}$ to $C_{36}$-monocarboxylic acids and optionally hydroxy-monocarboxylic acids, preferably with saturated, aliphatic $C_{14}$ to $C_{32}$-monocarboxylic acids and optionally hydroxy-monocarboxylic acids.

The commercially obtainable fatty acid esters, in particular of pentaerythritol and of glycerol, can contain <60% of various partial esters as a result of their preparation.

Saturated, aliphatic monocarboxylic acids having 10 to 36 C atoms are, for example, capric acid, lauric acid, myristic acid, palmitic acid, stearic acid, hydroxystearic acid, arachic acid, behenic acid, lignoceric acid, cerotic acid and montan acids.

Preferred saturated, aliphatic monocarboxylic acids having 14 to 22 C atoms are, for example, myristic acid, palmitic acid, stearic acid, hydroxystearic acid, arachic acid and behenic acid.

Saturated, aliphatic monocarboxylic acids such as palmitic acid, stearic acid and hydroxystearic acid are particularly preferred.

The saturated, aliphatic $C_{10}$ to $C_{36}$-carboxylic acids and the fatty acid esters either are known as such from the literature or can be prepared by processes known from the literature. Examples of pentaerythritol fatty acid esters are those of the particularly preferred abovementioned monocarboxylic acids.

Esters of pentaerythritol and of glycerol with stearic acid and palmitic acid are particularly preferred.

Esters of Guerbet alcohols and of glycerol with stearic acid and palmitic acid and optionally hydroxystearic acid are also particularly preferred.

The multilayered products according to the invention can contain organic dyestuffs, inorganic coloured pigments, fluorescent dyestuffs and particularly preferably optical brighteners.

According to the invention, those multilayered products which are chosen from the group consisting of sheets, films and three-dimensional mouldings are preferred.

The present invention likewise provides the use of the multilayered products according to the invention in particular for external uses with permanently high requirements with respect to the visual impression, such as, for example, glazing.

The present invention furthermore provides the use of the multilayered products according to the invention for the production of articles, in particular transparent panes in the architecture and automobile sector, wherein the polyalkyl(alkyl) acrylate layer (A) of the multilayered product has a critical drop speed for the rubber/glass transition (as a measure of the impact resistance) of from 20 m/s to 2.6 m/s, preferably 15 m/s to 2.6 m/s, measured in the sheet penetration test with a 13 kg drop weight with a drop impact tester, equipped with instruments, from RoellAmsler (IFW 420) at −30° C., mandrel diameter 20 mm.

The invention is illustrated further by the following examples, without being limited to these. The examples according to the invention merely reproduce preferred embodiments of the present invention.

EXAMPLES

Coextruded films with the structure bisphenol A polycarbonate (type Makrolon® 3108 (high-viscosity BPA-PC (MFR 6.5 g/10 min in accordance with ISO 1133 at 300° C. and 1.2 kg) without UV stabilizing))/acrylate layer of Altuglas DR2T TP 723 (an impact-modified PMMA with an MVR in accordance with ISO 1133 (230° C./3.8 kg) of 1.3 g/10 min, a Vicat temperature in accordance with ISO 306 of 87° C. and an elongation at break (in accordance with ISO 527-2) of 45%) from Arkema or Plexiglas 8N (PMMA with an MVR in accordance with ISO 1133 of 3 cm³/10 min) from Röhm GmbH & Co KG

Example 1

According to the Invention

Production of the Coex Film

The machines and apparatuses used for production of the coextruded films include:
- an extruder with a screw of 60 mm diameter (D) and a length of 33×D. The screw has a devolatilization zone;
- a coextruder for application of the top layer with a screw of length 25 D and a diameter of 35 mm;
- a melt pump;
- a cross head;
- a special coextrusion slot die 450 mm wide;
- a triple roll polishing calender with a horizontal roll arrangement, the third roll being swivellable by +/−45° with respect to the horizontal;
- a roller conveyor;
- thickness measurement;
- equipment for application of protective film on both sides;
- a take-off device;
- winding station.

The granules of the base material were fed to the hopper of the main extruder. Melting and conveying of the particular material took place in the particular plasticizing system of barrel/screw. The two material melts were brought together in the coextrusion die. From the die, the melt passes to the polishing calender, the rolls of which have the temperature stated in Table A. Final shaping and cooling of the material takes place on the polishing calender. A rubber roll was employed for structuring of the film surface on one side. The film is then transported through a take-off, the protective film is applied to both sides, and thereafter the film is wound up.

The following process parameters were chosen:

TABLE A

| | |
|---|---|
| Temperature of the main extruder | 295° C. +/− 5° C. |
| Temperature of the coextruder | 270° C. +/− 5° C. |
| Temperature of the cross head | 285° C. +/− 5° C. |
| Temperature of the die | 300° C. +/− 5° C. |
| Speed of rotation of the main extruder | 60 min⁻¹ |
| Speed of rotation of the coextruder | 31 min⁻¹ |
| Temperature of roll 1 | 76° C. |
| Temperature of roll 2 | 73° C. |
| Temperature of roll 3 | 140° C. |
| Take-off speed | 14.6 m/min |

Main Extruder:
Polycarbonate Makrolon® 3108 550115 from Bayer MaterialScience AG
Coextruder:
Altuglas DR2T TP 723 (impact-modified PMMA with an MVR in accordance with ISO 1133 (3.8 kg) of 0.8 g/10 min) from Arkema A film with smooth sides on the transparent polycarbonate layer and the transparent PMMA layer and a total layer thickness of 250 µm, the base layer being 235 µm and the coextruded layer 15 µm thick, was extruded from this.

The thickness of the transparent coating obtained in this way was determined by means of an Eta SD 30 from Eta Optik GmbH.

Example 2

According to the Invention

Film Coextrusion
Main Extruder:
Polycarbonate Makrolon 3108 550115 from Bayer MaterialScience AG
Coextruder:
Altuglas DR2T TP 723 (impact-modified PMMA with an MVR in accordance with ISO 1133 (3.8 kg) of 0.8 g/10 min) from Arkema A film with smooth sides on the transparent polycarbonate layer and the transparent PMMA layer and a total layer thickness of 250 µm, the base layer being 230 µm and the coextruded layer 20 µm thick, was extruded from this.

The thickness of the transparent coating obtained in this way was determined by means of an Eta SD 30 from Eta Optik GmbH.

Example 3

Not According to the Invention

Film Coextrusion
Main Extruder:
Polycarbonate Makroion® 3108 550115 from Bayer MaterialScience AG Coextruder:
Altuglas DR2T TP 723 (impact-modified PMMA with an MVR in accordance with ISO 1133 (3.8 kg) of 0.8 g/10 min) from Arkema A film with smooth sides on the transparent polycarbonate layer (B) and the transparent PMMA layer (A) and a total layer thickness of 250 μM, the base layer (B) being 225 μm and the coextruded layer (A) 25 μm thick, was extruded from this.

The thickness of the transparent coating obtained in this way was determined by means of an Eta SD 30 from Eta Optik GmbH.

Example 4

Not According to the Invention

Film Coextrusion
Main Extruder:
Polycarbonate Makrolon® 3108 550115 from Bayer MaterialScience AG
Coextruder:
Plexiglas 8N (PMMA moulding composition with an MVR in accordance with ISO 1133 of 3 cm$^3$/10 min) from Röhm GmbH & Co KG A film with smooth sides on the transparent polycarbonate layer and the transparent PMMA layer and a total layer thickness of 250 μm, the base layer being 235 μm and the coextruded layer 15 μm thick, was extruded from this.

The thickness of the transparent coating obtained in this way was determined by means of an Eta SD 30 from Eta Optik GmbH.

Example 5

Not According to the Invention

Film Coextrusion
Main Extruder:
Polycarbonate Makrolon 3108 550115 from Bayer MaterialScience AG
Coextruder:
Plexiglas 8N (PMMA moulding composition with an MVR in accordance with ISO 1133 of 3 cm$^3$/10 min) from Röhm GmbH & Co KG A film with smooth sides on the transparent polycarbonate layer and the transparent PMMA layer and a total layer thickness of 250 μm, the base layer (B) being 230 μm and the coextruded layer (A) 20 μm thick, was extruded from this.

The thickness of the transparent coating obtained in this way was determined by means of an Eta SD 30 from Eta Optik GmbH.

Example 6

Not According to the Invention

Film Coextrusion
Main Extruder:
Polycarbonate Makrolon® 3108 550115 from Bayer MaterialScience AG
Coextruder:
Plexiglas 8N (PMMA moulding composition with an MVR in accordance with ISO 1133 of 3 cm$^3$/10 min) from Röhm GmbH & Co KG A film with smooth sides on the transparent polycarbonate layer and the transparent PMMA layer and a total layer thickness of 250 μm, the base layer being 225 μm and the coextruded layer 25 μm thick, was extruded from this.

The thickness of the transparent coating obtained in this way was determined by means of an Eta SD 30 from Eta Optik GmbH.

Example 7

Insert Moulding

The films from Examples 1 to 6 were used for the evaluation in the film insert moulding process (FIM). The experiments were carried out on an injection moulding machine from Arburg. The Arburg Allrounder 570 C has a closing force of max. 200 to and is of build year 2003. The films were laid in the injection mould and insert moulding was carried out from the polycarbonate side with Makrolon AL 2647 at 300° C. The filling time was 2 sec and the injection pressure was measured as 1,000 bar. The mould temperature was set at 60° C. as standard. 3 mm thick insert-moulded sheets were obtained.

Example 8

Determination of the Rubber/Glass Transition (Critical Impact Speed) in the Sheet Penetration Test at −30° C.

Sheet penetration test with a 13 kg drop weight at various impact speeds with a drop impact tester, equipped with instruments, from RoellAmsler (IFW 420) at −30° C., mandrel diameter 20 mm, support diameter 40 mm, impact on the labelled (PC) layer (PMMA layer in the tensile zone) and on the opposite side, that is to say the PMMA layer (PC layer in the tensile zone).

The critical impact speed (also called the critical speed in the following) is the speed of the drop weight at which the damage pattern changes from a tough fracture (crack in the specimen) into a brittle fracture (splintering or punching out of the point of impact).

In the following, LT toughness means low temperature toughness.

TABLE 1

| | | Specimen designation | | |
|---|---|---|---|---|
| | | Sheet 1 invention | Sheet 2 invention | Sheet 3 not according to the invention |
| Delivery form | [mm$^2$] | 60 × 60 | 60 × 60 | 60 × 60 |
| Sheet thickness | [mm] | 3 | 3 | 3 |
| Thickness of PC film | [μm] | 235 | 230 | 225 |
| PMMA type | | Altuglas DR2T | Altuglas DR2T | Altuglas DR2T |
| PMMA layer thickness | [μm] | 15 (film from Example 1) | 20 (film from Example 2) | 25 (film from Example 3) |
| LT toughness PMMA in the tensile zone | | | | |
| crit. speed PC in the tensile zone | [m/s] | 9.8 ± 0.5 | 7.4 ± 0.5 | <2.6 |
| crit. speed | [m/s] | >13 | >13 | >13 |

Impact on the PMMA Layer (PC in the Tensile Zone)
With the PC layer in the tensile zone, the Altuglas shows tough properties under all conditions (up to 13 m/s).

With PMMA in the tensile zone, only the specimen with PMMA layer thicknesses of 25 μm and more (sheet 3 as a comparison example) fails even at the lowest impact speed possible in this test (<2.5 m/s), brittle fracture properties.

Impact on the PC Side (PMMA in the Tensile Zone):

The sheets with a PMMA layer thickness of 15 μm and 20 μm (sheets 1 and 2 according to the invention) show tough fracture properties in this test with PMMA in the tensile zone. The critical speed at which the transition from tough to brittle fracture takes place is 9.8 and 7.4 m/s respectively for these specimens.

TABLE 2

| | | Specimen designation | | |
|---|---|---|---|---|
| | | Sheet 4 not according to the invention | Sheet 5 not according to the invention | Sheet 6 not according to the invention |
| Delivery form | [mm²] | 60 × 60 | 60 × 60 | 60 × 60 |
| Sheet thickness | [mm] | 3 | 3 | 3 |
| Thickness of PC film | [μm] | 235 | 230 | 225 |
| PMMA type | | Plexiglas 8N | Plexiglas 8N | Plexiglas 8N |
| PMMA layer thickness | [μm] | 15 (film from Example 4) | 20 (film from Example 5) | 25 (film from Example 6) |
| LT toughness PMMA in the tensile zone | | | | |
| crit. speed PC in the tensile zone | [m/s] | 3.5 ± 0.2 | <2.6 | <2.6 |
| crit. speed | [m/s] | >13 | >13 | 3.5 ± 0.2 |

The PC/PMMA coextruded films insert-moulded with PC which were investigated (comparison experiments not according to the invention (sheets 4, 5 and 6) with PMMA which is not impact-modified) already show brittle fracture under multiaxial load (sheet penetration test) at −30° C. and an impact speed of less than 3.5 m/s when impact takes place on the polycarbonate side. i.e. the PMMA side is in the tensile zone. None of the PMMA layer thicknesses employed shows tough properties.

Example 9

Investigation of the Multilayered Composite (Example 1) after Weathering for 3,000 h at 0.75 W/m²/nm at 340 nm Weathering was carried out in a Ci5000 from Atlas at a radiation intensity of 0.75 W/m²/nm at 340 nm in a 102:18 dry/wet cycle. The filters chosen were boro/boro (daylight filtering), the blackboard temperature was 70 (±2)° C. and the specimen room temperature was 55 (±2)° C. (dry cycle) in accordance with the method of ASTM G 155.

| Weathering (hours) | Yellowness index: Example 1 (impact-mod. Altuglas in PC/PMMA) | Yellowness index: Example 4 (comparison) (homo-PMMA 8N in PC/PMMA |
|---|---|---|
| 0 | 1.30 | 1.45 |
| 323 | 1.75 | 2.22 |
| 600 | 2.70 | 3.55 |
| 925 | 3.75 | 5.11 |
| 1,200 | 4.88 | 6.55 |
| 1,500 | 6.27 | 8.93 |

Contrary to the teaching, the coex film according to the invention with the impact-modified PMMA proves to have a better resistance to UV light than the homo-PMMA.

The invention claimed is:

1. A multilayered product comprising a layer (A) and a layer (B), wherein layer (A) comprises impact-modified polyalkyl (alkyl)acrylate and has a layer thickness of less than 25 μm and layer (B) comprises polycarbonate and the total layer thickness of layers (A) and (B) is from 20 to 500 μm, wherein layer (A) has a thickness of less than 20 μm.

2. The multilayered product according to claim 1, wherein the total layer thickness is from 25 μm to 100 μm.

3. The multilayered product according to claim 1, wherein the total layer thickness is from 25 μm to 40 μm.

4. The multilayered product according to claim 1, wherein the total layer thickness is from 80 μm to 450 μm.

5. The multilayered product according to claim 1, wherein the total layer thickness is from 120 μm to 380 μm.

6. The multilayered product according to claim 1, wherein the total layer thickness is from 360 μm to 410 μm.

7. The multilayered product according to claim 1, wherein the impact-modified polyalkyl (alkyl)acrylate comprises polyalkyl (alkyl)acrylate as a polymer matrix and a core/shell impact modifier, wherein said core/shell impact modifier comprises a middle shell and an outer shell.

8. The multilayered product according to claim 7, wherein the multilayered product comprises from 5 to 60 wt. % of the impact modifier, based on the total composition of layer A.

9. The multilayered product according to claim 7, wherein the polymer matrix comprises polymethyl methacrylate and the impact modifier is as follows: the core is a crosslinked poly(methyl methacrylate/ethyl acrylate) copolymer, the middle shell is a crosslinked poly(butyl acrylate/styrene) copolymer and the outer shell is a poly(methyl methacrylate/ethyl acrylate) copolymer.

10. The multilayered product according to claim 1, wherein layer (B) is polycarbonate.

11. A method comprising producing articles comprising the multilayered products according to claim 1, wherein the polyalkyl (alkyl)acrylate layer (A) of the multilayered product has a critical drop speed for the rubber/glass transition (as a measure of the impact resistance) of from 20 m/s to 2.6 m/s, measured in the sheet penetration test with a 13 kg drop weight with a drop impact tester, equipped with instruments, from RoellAmsler (IFW 420) at −30° C., mandrel diameter 20 mm.

12. A transparent pane in the architecture and automobile sector, comprising the multilayered product according to claim 1.

* * * * *

UNITED STATES PATENT AND TRADEMARK OFFICE
CERTIFICATE OF CORRECTION

PATENT NO.        : 8,652,623 B2                                              Page 1 of 1
APPLICATION NO. : 13/319603
DATED             : February 18, 2014
INVENTOR(S)       : Pudleiner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 77 days.

Signed and Sealed this

Twenty-ninth Day of September, 2015

Michelle K. Lee
*Director of the United States Patent and Trademark Office*